US007976769B2

United States Patent
Fletcher et al.

(10) Patent No.: US 7,976,769 B2
(45) Date of Patent: Jul. 12, 2011

(54) METHOD OF MANUFACTURING A CERAMIC HONEYCOMB STRUCTURE

(75) Inventors: Tonia Havewala Fletcher, Big Flats, NY (US); Thomas George Havens, Painted Post, NY (US); Christopher John Malarkey, Corning, NY (US)

(73) Assignee: Corning Incorporated, Corning, NY (US)

( * ) Notice: Subject to any disclaimer, the term of this patent is extended or adjusted under 35 U.S.C. 154(b) by 167 days.

(21) Appl. No.: 12/275,602

(22) Filed: Nov. 21, 2008

(65) Prior Publication Data

US 2009/0140471 A1   Jun. 4, 2009

Related U.S. Application Data

(60) Provisional application No. 61/004,851, filed on Nov. 30, 2007.

(51) Int. Cl.
*B28B 1/00*     (2006.01)
*C04B 33/32*    (2006.01)
(52) U.S. Cl. .......................................... 264/630; 264/672
(58) Field of Classification Search .................. 264/630, 264/631, 652, 671, 672, 678
See application file for complete search history.

(56) References Cited

U.S. PATENT DOCUMENTS

| | | | |
|---|---|---|---|
| 2,356,850 A * | 8/1944 | Horberg | 451/49 |
| 3,887,739 A | 6/1975 | Kromrey | |
| 3,912,435 A | 10/1975 | Waring | |
| 4,304,585 A * | 12/1981 | Oda et al. | 65/43 |
| 5,183,609 A * | 2/1993 | Miyahara | 264/44 |
| 6,299,958 B1 * | 10/2001 | St. Julien et al. | 428/73 |
| 2005/0069675 A1 * | 3/2005 | Noguchi | 428/116 |
| 2005/0129590 A1 * | 6/2005 | Ichikawa | 422/180 |
| 2005/0159308 A1 | 7/2005 | Bliss et al. | 502/439 |
| 2007/0158879 A1 * | 7/2007 | Suwabe et al. | 264/630 |

FOREIGN PATENT DOCUMENTS

| | | |
|---|---|---|
| DE | 195 14 986 | 10/1996 |
| EP | 0 535 871 | 4/1993 |
| JP | 60067080 A * | 4/1985 |
| WO | 99/32277 | 7/1999 |

* cited by examiner

*Primary Examiner* — Matthew J Daniels
*Assistant Examiner* — Erin Snelting
(74) *Attorney, Agent, or Firm* — Joseph M. Homa (57) ABSTRACT

A method of manufacturing a honeycomb structure is disclosed wherein a green honeycomb body having a first contour is differentially altered such that the green honeycomb body has a second contour which is wider at a first end than at a second end. In one aspect, the altering is accomplished by removing a part of the green honeycomb body, such as with a removal tool. In another aspect, the altering is accomplished by exposing different regions of the honeycomb body to different drying environments.

20 Claims, 5 Drawing Sheets

METHOD OF MANUFACTURING A CERAMIC HONEYCOMB STRUCTURE

RELATED APPLICATIONS

This application claims the benefit of U.S. Provisional Application No. 61/004,851, filed Nov. 30, 2007, entitled "Method of Manufacturing a Ceramic Honeycomb Structure."

FIELD

The present invention relates to the manufacture of porous ceramic honeycomb structures, and more particularly to the manufacture of porous ceramic honeycomb structures such as substrates and wall-flow filters.

BACKGROUND

Ceramic honeycomb structures are widely used as anti-pollutant devices in engine exhaust systems, such as catalytic converter substrates in automobiles, and diesel particulate filters in diesel-powered vehicles. In these applications, the ceramic honeycomb structures are comprised of a matrix of ceramic webs, or walls, which define a plurality of cells or cell channels. The web matrix is typically surrounded by a skin layer. In filters, at least some of the channels are sealed by plugs, such as to force the exhaust to flow through the ceramic webs.

SUMMARY

A method is disclosed herein of manufacturing a honeycomb structure, the method comprising: providing a green honeycomb body having a first contour extending between opposing first and second ends, the green honeycomb body comprising first and second regions proximate the first and second ends, respectively; and differentially altering at least one of the first and second regions such that the green honeycomb body has a second contour extending between the first and second ends, wherein the second contour is wider at the first end than at the second end. In some embodiments, the first contour has a substantially constant width. In some embodiments, a ratio of the diameter D1 at the first end to the diameter D2 at the second end for the second contour between 1.01 and 1.15, and in some embodiments between 1.02 and 1.08, and in other embodiments between 1.03 and 1.07. In some embodiments, the taper T is defined as $T=L/(R2-R1)$, where L is the axial length of the honeycomb body, $R2=D2/2$, and $R1=D1/2$; in some of these embodiments $T>120$, and in other embodiments $T>200$, and in other embodiments $200<T<1000$, and in other embodiments $300<T<900$, and in other embodiments $300<T<700$, and in other embodiments $400<T<600$.

In some embodiments, the green honeycomb body is formed by extrusion. In some embodiments, the method further comprises extruding a green ceramic-forming honeycomb matrix extrudate and cutting the green ceramic-forming honeycomb body from the extrudate. In some embodiments, the green honeycomb body is cut orthogonally to an axis of extrusion.

In some embodiments, the green honeycomb body is extruded from a mixture containing ceramic-forming components. In some embodiments, the green honeycomb body is extruded from a mixture comprising green re-use (material comprised of extrudate formed from a second mixture comprising ceramic-forming components). In some embodiments, the green honeycomb body is comprised of ceramic-forming components. In some embodiments, the outermost layer is comprised of ground green re-use material.

In one aspect, the altering comprises removing a part of the honeycomb body. In some embodiments, prior to the altering, the green honeycomb body is heated sufficient to dry without ceramming the green honeycomb body. In some embodiments, after the removing, an outermost layer of a cement mixture is applied to the green honeycomb body, then the green honeycomb body is fired sufficient to ceram the green honeycomb body into a porous ceramic honeycomb structure having a third contour with a substantially constant width. In some embodiments, the part of the green honeycomb body is removed by contact between the green honeycomb body and a removal tool, such as a cutting tool or a grinding tool. In some embodiments, the removal tool has a taper T'. In some embodiments, the honeycomb body is rotated while the part is removed. In some embodiments, the tool revolves around the honeycomb body while the part is removed. In some embodiments, the green honeycomb body comprises a matrix of intersecting walls and the part removed is comprised of at least a portion of at least some of the walls. In some embodiments, the honeycomb body provided prior to the removal comprises a peripheral skin, and the part removed comprises at least some of the peripheral skin. In some embodiments, the peripheral skin is coextruded with the plurality of walls prior to the removing step. In some embodiments, the honeycomb body provided prior to the removal comprises a peripheral skin, and the part removed comprises at least some of the skin and at least a portion of at least some of the plurality of walls; in some embodiments, the peripheral skin is coextruded with the plurality of walls prior to the altering.

In another aspect, the altering comprises exposing the honeycomb body to a differential drying environment, e.g. the altering is accomplished by exposing different regions of the honeycomb body to different drying environments. In some embodiments, the differential drying environment comprises exposing the first and second regions of the honeycomb body to different humidities, different air flows, and/or different electromagnetic radiation (such as different powers, angles, or frequencies, or combinations thereof). In some embodiments, during the exposing, the honeycomb body stands on the first end, and after the exposing, an outermost layer of a cement mixture is applied to the green honeycomb body, then the green honeycomb body stands on it second end and is fired sufficient to ceram the green honeycomb body into a porous ceramic honeycomb structure having a third contour with a substantially constant width.

DETAILED DESCRIPTION

Figure 1:
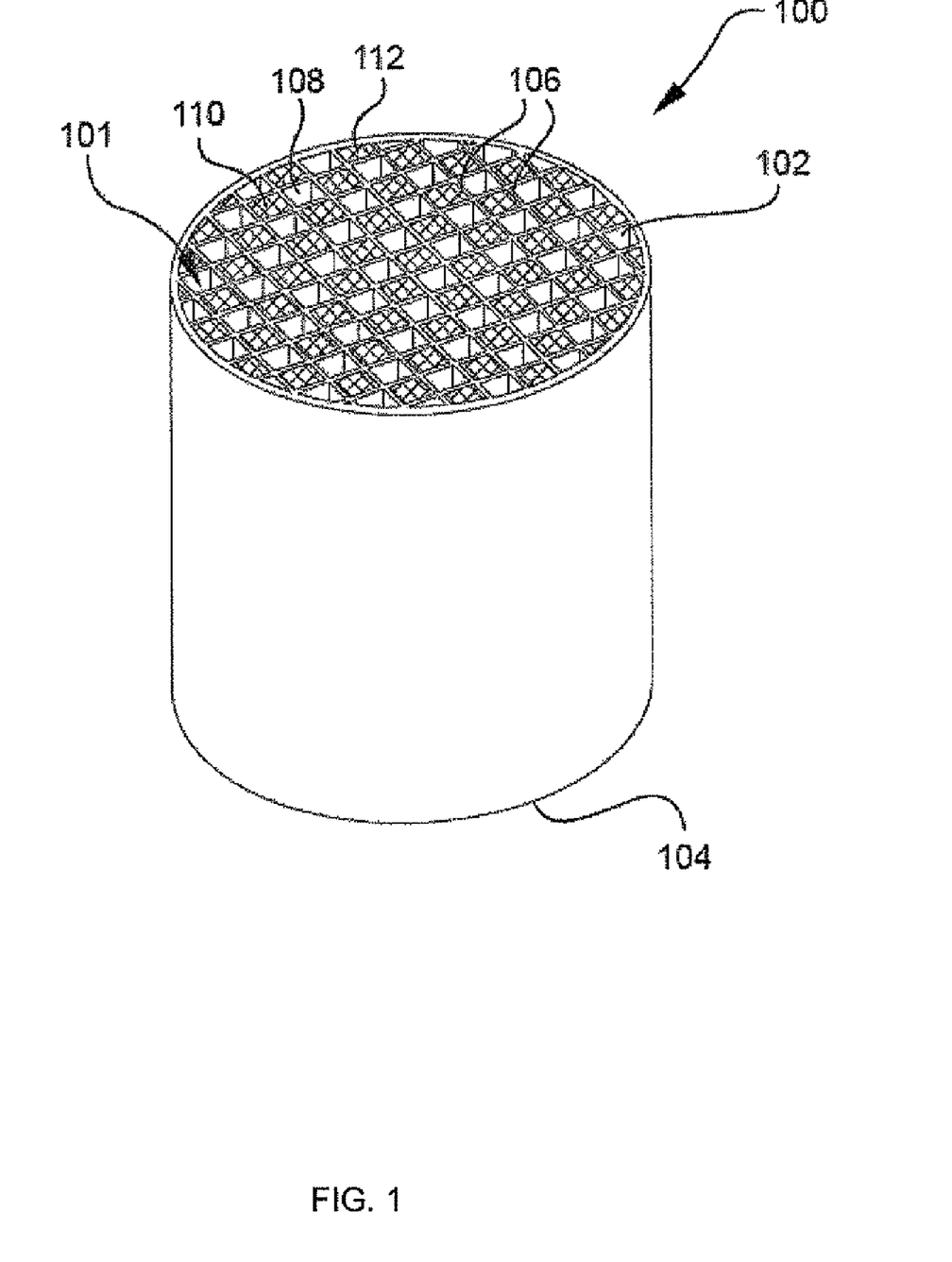
FIG. 1 is an isometric view of an exemplary honeycomb structure.

FIG. 1 illustrates an exemplary honeycomb structure 100 comprised of a honeycomb body 101 comprising a matrix of intersecting walls 106 defining a plurality of channels 108, 110 extending between a first end 102 and a second end 104. Patterns of plugs 112 are arranged on the first and second ends 102, 104 so that exhaust flows through the porous walls 106 of the channels 108, 110.

Figure 2:
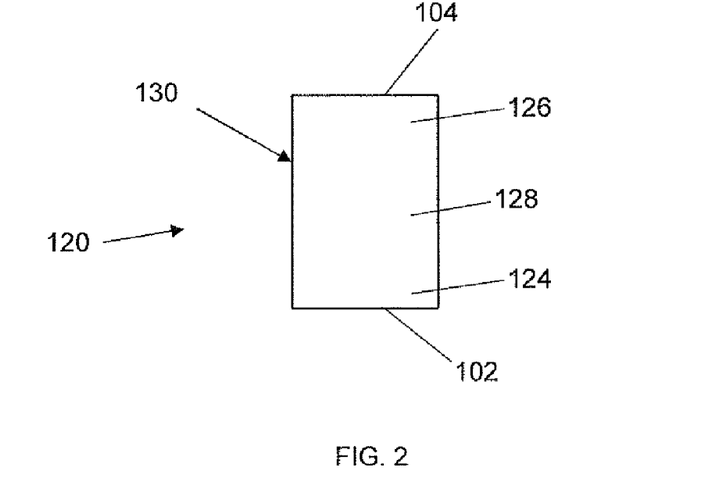
FIG. 2 is a side view representation of the honeycomb structure of FIG. 1 showing a first contour.

FIG. 2 illustrate an outline of a green honeycomb body 120, having a first contour 130 extending between opposing first and second ends 102, 104, the green honeycomb body 120 comprising first and second regions 124, 126, proximate the first and second ends 102, 104, respectively. The green honeycomb body 120 comprises a matrix of walls defining a plurality of cells extending between opposing first and second ends 102, 104 of the green honeycomb body, the body having an outer peripheral portion 128 extending between the first and second ends. The honeycomb body 120 may have plugging material disposed in some of the cells; for example, a first subset of cells may have plugging material inserted at the first end 102 and are open at the second end 104, such as in a checkered pattern, and a second subset of cells may have plugging material inserted at the second end 104 and are open at the first end 102, such as in a matching checkered pattern, such as for forming a porous ceramic filter upon firing of the green honeycomb body, wherein the plugging material seals against the walls defining the respective cell upon the firing to form plugs. In some embodiments, the majority of all cells in the green honeycomb body 120 contain no plugging material, such as for forming a substrate or a washcoat substrate. We have found that firing of the matrix, particularly simultaneous firing of the matrix along with uncured skin, and also simultaneous firing of the matrix along with plugging material and uncured skin, results in changes in the profile of the honeycomb body during firing, such that the resulting fired ceramic honeycomb body does not have a uniform diameter from end to end.

Preferably, the green honeycomb body 120, and particularly the matrix of intersecting walls 106, is formed by extrusion, for example by extruding a green ceramic-forming honeycomb matrix extrudate comprising a matrix of intersecting walls and cutting the green ceramic-forming honeycomb body from the extrudate; preferably, the green honeycomb body is cut orthogonally to the axis of extrusion. The green honeycomb body 120 is derived from an extrusion of a mixture containing ceramic-forming components. Thus, the extrudate, and the green honeycomb body, are comprised of ceramic-forming components.

Optionally, the green honeycomb body is extruded from a mixture comprising green re-use, i.e. material comprised of extrudate, or pieces of extrudate, i.e. previously extruded material, formed from a second mixture comprising ceramic-forming components, which has been pulverized or ground, particularly green honeycomb reuse.

The honeycomb body 120 may be provided with a peripheral skin, e.g. the peripheral skin may be co-extruded with the honeycomb matrix of intersecting walls.

The first contour 130 of the green honeycomb body 120 may have a substantially constant width, e.g. constant diameter, although a body having a first contour 130 of varied width can also be utilized.

Figure 3:
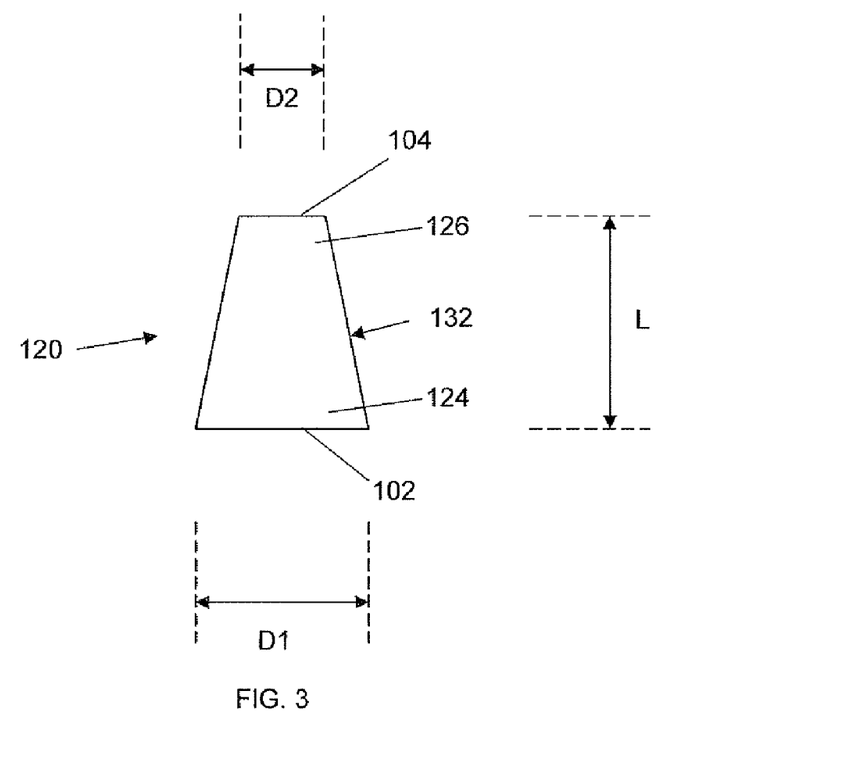
FIG. 3 is a side view representation of the honeycomb structure of FIG. 2 after differential altering of the honeycomb structure resulting in a second contour.

As illustrated in FIG. 3, methods of manufacturing a honeycomb structure disclosed herein comprises differentially altering at least one of the first and second regions 124, 126 such that the green honeycomb body 120 has a second contour 132 extending between the first and second ends 102, 104, wherein the second contour 132 is wider at the first end 102 than at the second end 104. In some embodiments, the second contour 132 is a taper. In some embodiments, a ratio of the width, here diameter D1, at the first end 102 to the width, here diameter D2, at the second end 104 for the second contour 132 is between 1.01 and 1.15, and in some embodiments between 1.02 and 1;08, and in other embodiments between 1.03 and 1.07. In some embodiments, the taper T is defined as $T=L/(R2-R1)$, where L is the axial length of the honeycomb body, $R2=D2/2$, and $R1=D1/2$; in some of these embodiments $T>120$, and in other embodiments $T>200$, and in other embodiments $200<T<1000$, and in other embodiments $300<T<900$, and in other embodiments $300<T<700$, and in other embodiments $400<T<600$.

Figure 4:
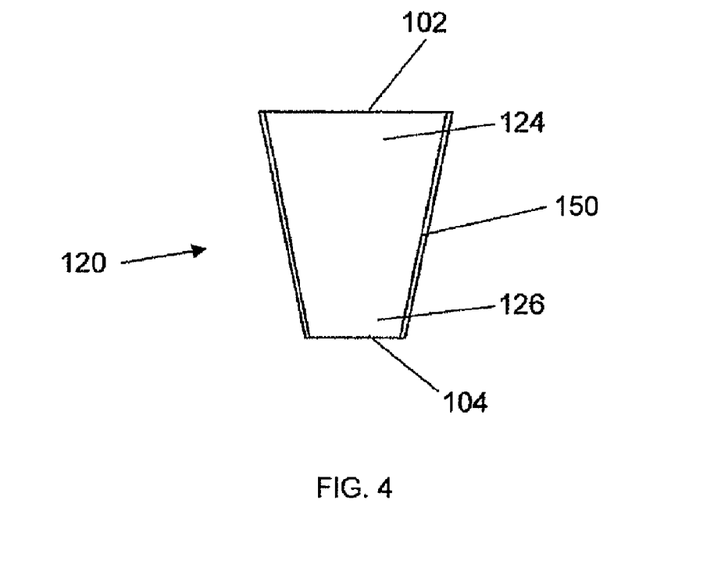
FIG. 4 is a side view representation of the honeycomb structure of FIG. 3 with an outermost layer applied thereto shown in cutaway.

As represented by FIG. 4, the method preferably further comprises applying an outermost layer 150 of a cement mixture to the green honeycomb body 120, wherein only the outermost layer 150 is shown in cutaway view. Preferably, a uniform thickness of the outermost layer 150 is applied, as illustrated in FIG. 4, although varied thicknesses of the applied cement mixture may also be utilized.

In some embodiments, the outermost layer 150 comprises green honeycomb reuse. Use of a pre-agglomerated milled powder of larger particle size allows a reduced amount of liquid vehicle to be added to the batch mixture, thus helping to eliminate shrinkage; additionally, the tackiness of the batch mixture (i.e. the rheology of the batch mixture) can be reduced, and a low coefficient of thermal expansion (CTE) for the after-applied skin or outermost layer 150 can be maintained. In some embodiments, the green honeycomb body 120 is extruded from a mixture substantially comprised of green re-use, with little or no other inorganic powders. For example, green dried honeycombs can be crushed, then ground to an appropriate particle size, such as by pin mills, powderizers, or micronizers; the material can then be mixed with water and optionally virgin materials (e.g. materials such as inorganic materials which have not yet been combined into an extrusion batch) in desired proportions; the material(s) can then be applied to the contoured (second contour 132) green honeycomb body 120, and then the body is fired.

Figure 5:
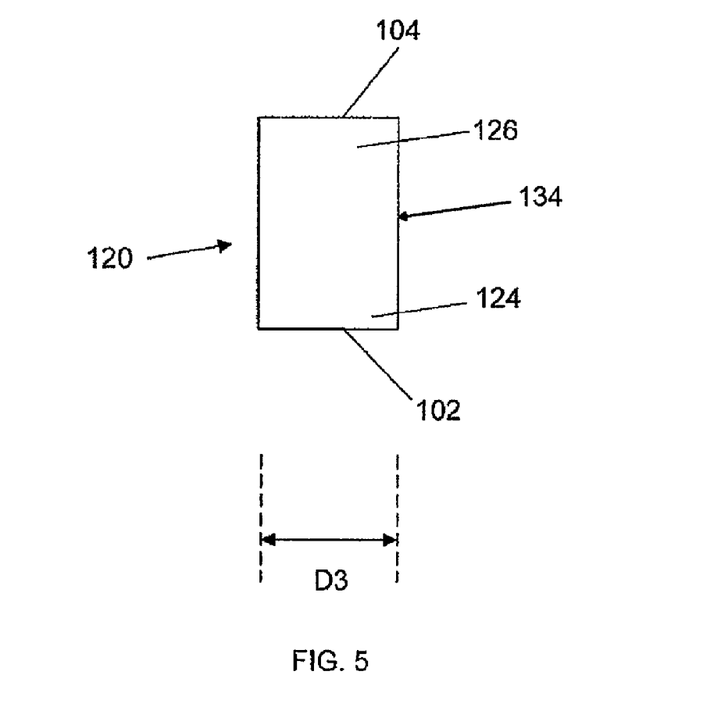
FIG. 5 is a side view representation of the honeycomb structure of FIG. 4 after firing.

The method preferably further comprises firing the green honeycomb body 120 sufficient to ceram the green honeycomb body into a porous ceramic honeycomb structure having a third contour 134 with a substantially constant width, or diameter D3 as illustrated in FIG. 5. We have found differences in results of firing depending upon the type of firing apparatus (e.g. oven or kiln) used (regardless of whether or not the honeycomb body is provided with an artificial after-applied skin or outermost layer), namely that firing within a periodic oven tends to cause the bottom region of a honeycomb body to shrink in diameter and tends to cause the top region of a honeycomb body to expand in diameter, whereas firing within a tunnel kiln tends to cause the top region of a honeycomb body to shrink in diameter and tends to cause the bottom region of a honeycomb body to expand in diameter. Thus, in some embodiments, when firing in a periodic oven, the honeycomb body 120 is preferably oriented vertically while standing on its first end 102, and in other embodiments, when firing in a tunnel kiln, the honeycomb body 120 is preferably oriented vertically while standing on its second end 104, in order to result in a porous ceramic honeycomb structure having a third contour 134 with a substantially constant width, or diameter D3. The honeycomb matrix of intersecting walls as well as an outermost layer of cement mixture are preferably fired simultaneously, for example while the honeycomb body is in a single kiln or oven. In embodiments having plugging material inserted into various cells, the plugging material, outermost layer, and honeycomb matrix are fired simultaneously. During firing, the honeycomb body 120 stands on its second end 104, such as on a horizontal surface inside a kiln or oven, such that initially (at the beginning of firing) the top (first end 102) is wider than the bottom (second end 104), but wherein the body 120 slumps during firing, and at the end of firing, the honeycomb body has changed shape such that the top and bottom then have substantially the same diameter D3.

Figure 6:
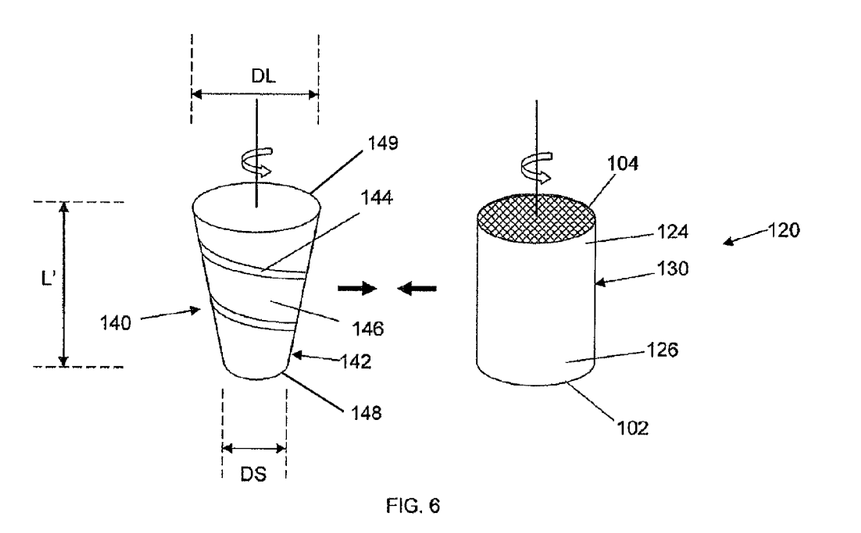
FIG. 6 is an isometric representation of a green honeycomb body and a tool for differentially altering the honeycomb body.

In one aspect, the altering comprises removing a part of the honeycomb body 120. Preferably, prior to the altering, the green honeycomb body 120 is heated sufficiently to dry the green honeycomb body without ceramming the green honeycomb body. In some embodiments, after the removing, an outermost layer 150 of cement mixture is applied to the green honeycomb body, then the green honeycomb body is fired sufficient to ceram the green honeycomb body into a porous ceramic honeycomb structure having a third contour 134 with a substantially constant diameter D3. In some embodiments, part of the green honeycomb body is removed by contact between the green honeycomb body and a removal tool, such as a grinding tool or a cutting tool; in some embodiments, such as illustrated in FIG. 6, the removal tool 140 has a taper 142, and preferably has at least one spiral groove 144 disposed on the outer periphery 146 of the tool for assisting in carrying the ground or cut green material away from the honeycomb body during the altering. In some embodiments, the ratio of the width DS at a small end 148 of the taper 142 to the width DL at a large end 149 of the taper 142 is between 1.01 and 1.15, and in other embodiments between 1.02 and 1.08, and in other embodiments between 1.03 and 1.07. In some embodiments, the taper 142 is defined as T'=L'/(RL−RS), where L' is the axial length of the working face of the tool (which in some embodiments corresponds to the axial length L of the honeycomb body to be altered), RL=DL/2, and RS=DS/2; in some of these embodiments T'>120, and in other embodiments T'>200, and in other embodiments 200<T'<1000, and in other embodiments 300<T'<900, and in other embodiments 300<T'<700, and in other embodiments 400<T'<600. In some embodiments, the honeycomb body 120 is rotated while the part of the body is being removed. In some embodiments, the tool 140 rotates while the part is removed. In some embodiments, both the honeycomb body 120 and the tool 140 rotate while the part is being removed; in some of these embodiments, both the honeycomb body 120 and the tool 140 rotate in the same direction (for example, both rotate in a common clockwise direction, as illustrated in FIG. 6, while the part is being removed; in some of these embodiments, both the honeycomb body and the tool rotate in the same direction but at different rotational speeds while the part is being removed; in some of these embodiments, both the honeycomb body and the tool rotate in the same direction but the body rotates at a slower rotational speed than the honeycomb body while the part is being removed. In some embodiments, the tool revolves around the honeycomb body while the part is removed. In some embodiments, the axis of rotation of the tool 140 is oriented vertically with DL on top, as illustrated in FIG. 6; in other embodiments, the axis of rotation of the tool 140 is oriented vertically with DS on top (not illustrated).

In some embodiments, the part removed is comprised of at least a portion of at least some of the plurality of walls. In some embodiments, the honeycomb body provided prior to the removal comprises a peripheral skin, and the part removed comprises at least some of the peripheral skin; in some embodiments, the peripheral skin is coextruded with the plurality of walls prior to the removing. In some embodiments, the honeycomb body provided prior to the removal comprises a peripheral skin, and the part removed comprises at least some of the skin and at least a portion of at least some of the plurality of walls; in some of these embodiments, the peripheral skin is coextruded with the plurality of walls prior to the altering.

In another aspect, the altering comprises exposing the honeycomb body to a differential drying environment, and in particular exposing the first and second regions 124, 126 to a differential drying environment i.e. the first and second regions 124, 126 are exposed to different drying environments. In some embodiments, the differential drying environment comprises exposing the first and second regions 124, 126 of the honeycomb body to different humidities, different air flows, and/or different electromagnetic radiation (such as diverse powers, angles of irradiation, radiation frequencies, or combinations thereof). In some embodiments, during the exposing, the honeycomb body stands on the first end 102 (here, bottom), and after the exposing, an outermost layer of a cement mixture is applied to the green honeycomb body, then the green honeycomb body stands on its second end 104 and is fired sufficient to ceram the green honeycomb body into a porous ceramic honeycomb structure having a third contour 134 with a substantially constant width. The green honeycomb body is exposed to the differential drying environment (without ceramming the green honeycomb body), wherein a first region 124 proximate the first end 102 is dried differently than a second region 126 proximate the second end 104, thereby causing the honeycomb body to slump toward the second end 104 during the heating during drying, thereby causing the honeycomb body to define a second contour 132 different from the first contour 130, wherein the second contour 132 is wider at the first end 102 than at the second end 104; the honeycomb body is then stood on the first end 102 (now narrower) and fired, resulting in a porous ceramic honeycomb structure having a third contour 134 with a substantially constant width.

Figure 7:
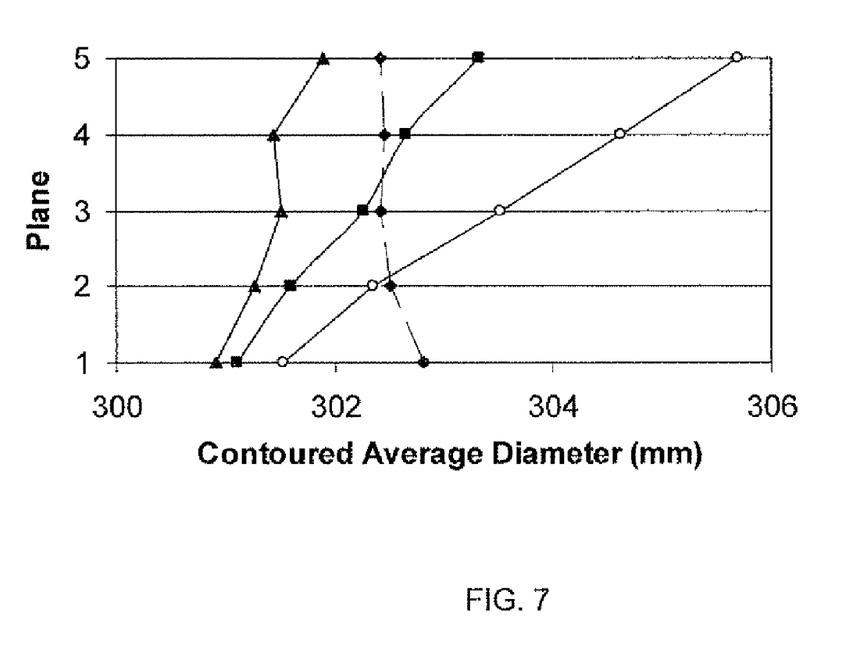
FIG. 7 schematically depicts the contours of green honeycomb bodies that were cut by a tool, wherein the average diameter of each body at various planes is shown.
Figure 8:
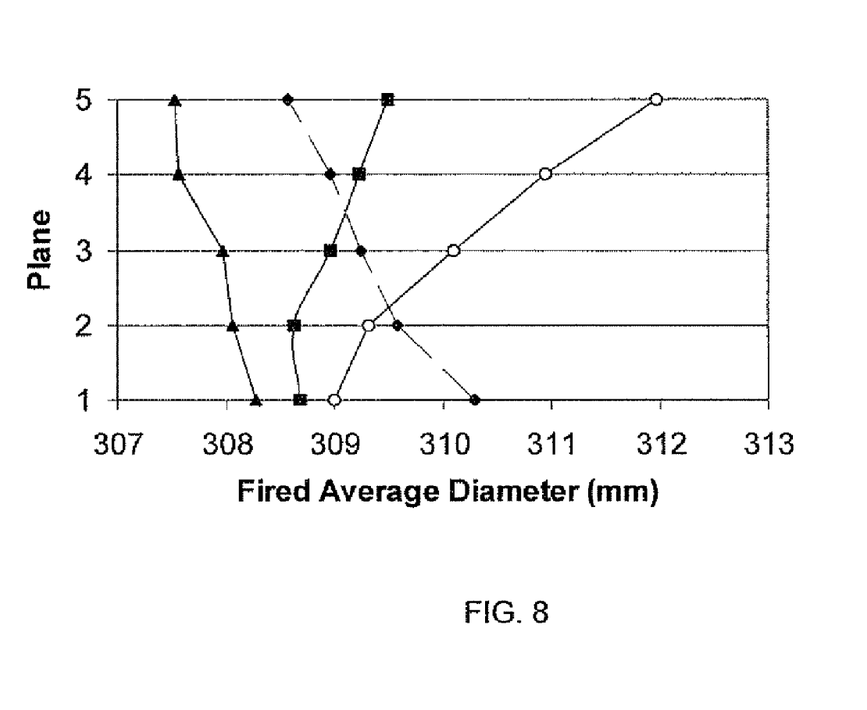
FIG. 8 schematically depicts the contours of the contoured green honeycomb bodies of FIG. 7 after firing into porous honeycomb bodies.

FIG. 7 shows the second contour at various transverse planes taken perpendicular along the axial length of various honeycomb bodies, wherein the contour was achieved by removing part of the bodies with four different taper tools, each having taper tool dimensions L'(axial length), RL=DL/2, RS=DS/2, wherein L'was 12 inches (305 mm) for each and RL was 0.75 inch (19.05 mm) for each, and wherein RS was 0.65 inch (16.5 mm) (hollow circle), 0.70 inch (17.8 mm) (solid triangle), 0.73 inch (18.5 mm) (solid square), and 0.75 inch (19.05 mm)—i.e. zero taper—(solid diamond), respectively. For these tools, the ratio DL/DS (or RL/RS) was 1.15, 1.07, 1.03, and 1.00, respectively. A substantially uniform cement mixture was applied to the bodies, then fired. FIG. 8 shows the third contour at various transverse planes taken perpendicular along the axial length of the honeycomb bodies cut by the taper tools with RS of 0.65 inch (16.5 mm) (hollow circle), 0.70 inch (17.8 mm) (solid triangle), 0.73 inch (18.5 mm) (solid square), and 0.75 inch (19.05 mm) (solid diamond).

FIG. 6 is a schematic representation of one embodiment wherein the tool 140 is a taper tool. The tool has an axis of rotation coincident with a spindle or holder of the tool. Preferably the tool has an axial length L' which is the same size as, or even more preferably larger in size than, the length of the honeycomb body being shaped. Preferably the surface of the tool is provided with at least one spiral groove 144 which facilitates conveyance away of the material that is removed from the body. In some embodiments, at least the surface of the tool is comprised of an abrasive material such as carbide; in some of these embodiments, the at least one spiral groove 144 is provided by the absence of the abrasive material such as carbide, wherein the surface of the spiral groove 144 is smooth, at least relative to the remainder of the taper surface.

In another aspect, a method is disclosed herein of manufacturing a honeycomb structure, the method comprising: providing a green honeycomb body comprising a plurality of walls defining a plurality of cells extending between opposing first and second ends of the green honeycomb body, the body having an outer peripheral portion extending between the first and second ends, the honeycomb body defining a first contour; standing the honeycomb body on the first end; exposing the green honeycomb body to a differential drying environment (without ceramming the green honeycomb body), wherein a first region proximate the first end is dried differently than a second region proximate the second end, thereby causing the honeycomb body to slump toward the second end during the heating, thereby causing the honeycomb body to define a second contour different from the first contour, wherein the second contour is wider at the first end than at the second end; applying an outermost layer of a cement mixture to the outer peripheral portion; standing the honeycomb body on the second end; and firing the green honeycomb body sufficient to ceram the green honeycomb body into a porous ceramic honeycomb structure having a substantially constant width extending from the first end to the second end. In some embodiments, the differential drying environment comprises exposing the first and second regions of the honeycomb body to different humidities, different air flows, and/or different electromagnetic radiation (such as different powers, angles, or frequencies, or combinations thereof).

In another aspect, a method is disclosed of manufacturing a honeycomb structure, the method comprising: providing a green honeycomb body comprising a plurality of walls defining a plurality of cells extending between opposing first and second ends of the green honeycomb body, the body having an outer peripheral portion extending between the first and second ends, the outer peripheral portion defining a first contour; removing a part of the outer peripheral portion of the honeycomb body, wherein a remainder of the outer peripheral portion defines a second contour different from the first contour, wherein the second contour is wider at the first end than at the second end. In some embodiments, the method further comprises, prior to the removing, heating the green honeycomb body sufficient to dry without ceramming the green honeycomb body. In some embodiments, the method further comprises, after the removing, adding an outermost layer of a cement mixture to the outer peripheral portion. In some embodiments, the method further comprises standing the honeycomb body on the second end. In some embodiments, the method further comprises firing the green honeycomb body sufficient to ceram the green honeycomb body and the outermost layer into a porous ceramic honeycomb structure having a substantially constant width extending from the first end to the second end. In some embodiments, the firing causes the outermost layer to ceram into a fired outermost layer. In some embodiments, the method further comprises placing the second end of the honeycomb body into contact with a horizontal surface. In some embodiments, the second end of the honeycomb body rests on a horizontal surface to place the honeycomb in a vertical orientation during the firing; the fired outermost layer defines a fired contour; preferably the fired contour has a substantially constant width, i.e. at all points on the surface of the outermost layer from the first end to the second end.

The invention claimed is:

1. A method of manufacturing a honeycomb structure, the method comprising:
    providing green honeycomb body having a first contour extending between opposing first and second ends, the green honeycomb body comprising first and second regions proximate the first and second ends, respectively;
    differentially altering at least one of the first and second regions such that the green honeycomb body has a second contour extending between the first and second ends, wherein the second contour is wider at the first end than at the second end; and
    standing the green honeycomb body on the first end in a periodic oven and firing the green honeycomb body into a porous ceramic honeycomb structure having a third contour with a substantially constant width.

2. The method of claim 1 wherein the first contour has a substantially constant width.

3. The method of claim 1 wherein, for the second contour, the ratio of the width at the first end to the width at the second end is between 1.01 and 1.15.

4. The method of claim 1 wherein the second contour comprises a taper "T" between 200 and 1000.

5. The method of claim 1 wherein the altering comprises removing a part of the honeycomb body.

6. The method of claim 5 wherein, prior to the altering, the green honeycomb body is heated sufficient to dry without ceramming the green honeycomb body.

7. The method of claim 5 wherein, after the removing, an outermost layer of a cement mixture is applied to the green honeycomb body, then the green honeycomb body is fired sufficient to ceram the green honeycomb body into the porous ceramic honeycomb structure having the third contour with the substantially constant width.

8. The method of claim 7 wherein the outermost layer comprises re-used green honeycomb particles.

9. The method of claim 5, wherein the part of the green honeycomb body is removed by contact between the green honeycomb body and a removal tool.

10. The method of claim 9 wherein the removal tool has a taper.

11. The method of claim 10 wherein the taper "T" of the removal tool is between 200 and 1000.

12. The method of claim 9 wherein the honeycomb body is rotated while the part is removed.

13. The method of claim 9 wherein the tool is rotated while the part is removed.

14. The method of claim 5 wherein the honeycomb body is rotated while the part is removed.

15. The method of claim 5 wherein the green honeycomb body comprises a matrix of intersecting walls, and wherein the part removed is comprised of at least a portion of at least some of the walls.

16. The method of claim 5 wherein the honeycomb body provided prior to the removal comprises a peripheral skin, and wherein the part removed comprises at least some of the peripheral skin.

17. The method of claim 1 wherein the altering comprises exposing the honeycomb body to a differential drying environment.

18. The method of claim 17 wherein the differential drying environment comprises exposing the first and second regions of the honeycomb body to different humidities, different air flows and/or different electromagnetic radiation.

19. The method of claim 17 wherein during the exposing, the honeycomb body stands on the first end, and after the exposing, an outermost layer of a cement mixture is applied to the green honeycomb body, then the green honeycomb body stands on the second end and is fired sufficient to ceram the green honeycomb body into a porous ceramic honeycomb structure having a third contour with a substantially constant width.

20. The method of claim 1 wherein the green honeycomb body is formed by extrusion.

* * * * *